(12) United States Patent
Johnson et al.

(10) Patent No.: US 7,904,306 B2
(45) Date of Patent: Mar. 8, 2011

(54) METHOD AND APPARATUS FOR ASSESSING CREDIT FOR HEALTHCARE PATIENTS

(75) Inventors: Steven G. Johnson, Eagan, MN (US); Christopher G. Busch, Golden Valley, MN (US)

(73) Assignee: Search America, Inc., Maple Grove, MN (US)

( * ) Notice: Subject to any disclaimer, the term of this patent is extended or adjusted under 35 U.S.C. 154(b) by 925 days.

(21) Appl. No.: 11/218,069

(22) Filed: Sep. 1, 2005

(65) Prior Publication Data

US 2006/0111940 A1   May 25, 2006

Related U.S. Application Data

(60) Provisional application No. 60/606,306, filed on Sep. 1, 2004.

(51) Int. Cl.
*G06Q 10/00* (2006.01)
(52) U.S. Cl. ............ 705/2; 705/3; 705/36; 705/38
(58) Field of Classification Search ............ 705/2–3, 705/36, 38
See application file for complete search history.

(56) References Cited

U.S. PATENT DOCUMENTS

| | | |
|---|---|---|
| 4,491,725 A | 1/1985 | Pritchard |
| 4,812,628 A | 3/1989 | Boston et al. |
| 4,947,028 A | 8/1990 | Gorog |
| 5,301,105 A | 4/1994 | Cummings, Jr. |
| 5,557,514 A * | 9/1996 | Seare et al. ............ 705/2 |
| 5,583,760 A | 12/1996 | Klesse |
| 5,644,778 A | 7/1997 | Burks et al. |
| 5,704,044 A | 12/1997 | Tarter et al. |
| 5,764,923 A * | 6/1998 | Tallman et al. ............ 705/3 |
| 5,832,447 A | 11/1998 | Rieker et al. |
| 5,884,287 A | 3/1999 | Edesess |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 6,014,632 A | 1/2000 | Gamble et al. |
| 6,044,351 A | 3/2000 | Jones |

(Continued)

FOREIGN PATENT DOCUMENTS

WO    WO94/12943    6/1994

(Continued)

OTHER PUBLICATIONS

1998 Health Care Survey of DoD Beneficiaries: Technical Manual, Jul. 1999 in 96 pages.

(Continued)

*Primary Examiner* — Vanel Frenel
(74) *Attorney, Agent, or Firm* — Knobbe Martens Olson & Bear LLP

(57) ABSTRACT

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor. Also, according to another example embodiment, the model is not a generic model for all patients, but the variables and their parameters are specific to a particular healthcare organization's or facility's patient population. This creates a custom model that further enhances its predictiveness.

29 Claims, 3 Drawing Sheets

U.S. PATENT DOCUMENTS

| | | |
|---|---|---|
| 6,044,352 A | 3/2000 | Deavers |
| 6,067,522 A | 5/2000 | Warady et al. |
| 6,073,104 A | 6/2000 | Field |
| 6,098,052 A | 8/2000 | Kosiba et al. |
| 6,108,641 A | 8/2000 | Kenna et al. |
| 6,163,770 A | 12/2000 | Gamble et al. |
| 6,171,112 B1 | 1/2001 | Clark et al. |
| 6,185,543 B1 | 2/2001 | Galperin et al. |
| 6,208,973 B1 | 3/2001 | Boyer et al. |
| 6,374,229 B1 | 4/2002 | Lowrey et al. |
| 6,453,297 B1 | 9/2002 | Burks et al. |
| 6,456,983 B1 | 9/2002 | Keyes et al. |
| 6,513,018 B1 | 1/2003 | Culhane |
| 6,611,816 B2 | 8/2003 | Lebda et al. |
| 6,684,093 B2 | 1/2004 | Kuth |
| 6,826,535 B2 | 11/2004 | Wood et al. |
| 6,847,942 B1 | 1/2005 | Land et al. |
| 6,901,406 B2 | 5/2005 | Nabe et al. |
| 7,003,491 B2 | 2/2006 | Starkman |
| 7,072,842 B2 | 7/2006 | Provost et al. |
| 7,133,840 B1 | 11/2006 | Kenna et al. |
| 7,171,371 B2 | 1/2007 | Goldstein et al. |
| 7,174,302 B2 | 2/2007 | Patricelli et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,246,068 B2 | 7/2007 | Thomas, Jr. |
| 7,295,988 B1 | 11/2007 | Reeves |
| 7,298,872 B2 | 11/2007 | Glisson |
| 7,305,359 B2 | 12/2007 | Bonnell |
| 7,328,276 B2 | 2/2008 | Alisuag |
| 7,333,937 B2 | 2/2008 | Baldwin, Jr. et al. |
| 7,380,707 B1 | 6/2008 | Fredman |
| 7,383,215 B1 | 6/2008 | Navarro et al. |
| 7,527,967 B2 | 5/2009 | Chao et al. |
| 2001/0034618 A1 | 10/2001 | Kesller et al. |
| 2001/0039523 A1 | 11/2001 | Iwamoto |
| 2002/0010594 A1 | 1/2002 | Levine |
| 2002/0103680 A1 | 8/2002 | Newman |
| 2002/0107849 A1 | 8/2002 | Hickey et al. |
| 2002/0133503 A1 | 9/2002 | Levine |
| 2002/0147617 A1* | 10/2002 | Schoenbaum et al. ............ 705/4 |
| 2002/0184054 A1 | 12/2002 | Cox et al. |
| 2002/0188478 A1 | 12/2002 | Breeland et al. |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0046112 A1 | 3/2003 | Dutta et al. |
| 2003/0046223 A1 | 3/2003 | Crawford et al. |
| 2003/0050795 A1* | 3/2003 | Baldwin et al. ................... 705/2 |
| 2003/0050796 A1 | 3/2003 | Baldwin, Jr. et al. |
| 2003/0229507 A1 | 12/2003 | Perge |
| 2003/0233259 A1 | 12/2003 | Mistretta et al. |
| 2004/0049473 A1 | 3/2004 | Gower et al. |
| 2004/0073456 A1 | 4/2004 | Gottlieb et al. |
| 2004/0107161 A1 | 6/2004 | Tanaka et al. |
| 2004/0111292 A1* | 6/2004 | Hutchins ........................... 705/2 |
| 2004/0177030 A1 | 9/2004 | Shoham |
| 2004/0267660 A1 | 12/2004 | Greenwood et al. |
| 2005/0086071 A1 | 4/2005 | Fox et al. |
| 2005/0086072 A1 | 4/2005 | Fox et al. |
| 2005/0086579 A1 | 4/2005 | Leitner et al. |
| 2005/0137912 A1 | 6/2005 | Rao et al. |
| 2005/0209880 A1 | 9/2005 | Drelicharz et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0111940 A1 | 5/2006 | Johnson et al. |
| 2006/0155639 A1 | 7/2006 | Lynch et al. |
| 2006/0235743 A1 | 10/2006 | Long et al. |
| 2006/0242049 A1 | 10/2006 | Haggerty et al. |
| 2006/0242051 A1 | 10/2006 | Haggerty et al. |
| 2006/0282359 A1 | 12/2006 | Nobili et al. |
| 2007/0118410 A1 | 5/2007 | Nadai |
| 2007/0198336 A1 | 8/2007 | Thompson |
| 2007/0198407 A1 | 8/2007 | Winter |
| 2007/0214005 A1 | 9/2007 | Kennedy |
| 2007/0258626 A1 | 11/2007 | Reiner |
| 2007/0279187 A1 | 12/2007 | Kekmatpour et al. |
| 2007/0299699 A1 | 12/2007 | Policelli et al. |
| 2008/0091592 A1 | 4/2008 | Blackburn et al. |
| 2008/0109315 A1 | 5/2008 | Huang et al. |
| 2008/0120133 A1 | 5/2008 | Krishnaswami et al. |
| 2008/0189202 A1 | 8/2008 | Zadoorian et al. |
| 2008/0288283 A1 | 11/2008 | Baldwin, Jr. et al. |
| 2009/0276244 A1 | 11/2009 | Baldwin, Jr. et al. |

FOREIGN PATENT DOCUMENTS

| | | |
|---|---|---|
| WO | WO95/12857 | 5/1995 |
| WO | WO 99-46710 | 9/1999 |
| WO | WO01/04821 | 1/2001 |
| WO | WO02/13047 | 2/2002 |
| WO | WO 2004/114160 | 12/2004 |
| WO | WO2008/021061 | 2/2008 |

OTHER PUBLICATIONS

Alberta Report, Jayhawk Medical Acceptance, Celeste McGovern, Aug. 23, 1999, in 1 page.

An Expert System for Determining Medicaid Eligibility, Journal of Medical Systems, vol. 12, Nov. 5, 1988, in 10 pages.

Badgercare, Division of Health Care Financing in 5 pages. Date of publication unknown.

Bell & Howell Information and Learning Company, Fix your Nose, if You Wish, but not With this New Loan, Karen Cheney, May 1, 1998, vol. 27 No. 5, in 1 page.

Birch & Davis—Press Release, Birch & Davis Wins Texas Chip Contract, Jan. 4, 2000, in 3 pages.

Broward County CAP Grant Application, Date of Publication Unknown, in 41 pages.

Business Wire, MediCredit Announces Major Investment from Medstone; Financing Will Enable Dramatic Expansion of Online Services, Long Beach, California, May 12, 2000, in 2 pages.

Canadian Medical Association or its Licensors, Huge Declines in Price as Competition Heats up in Vancouver's Booming Laser-Surgery market, Oct. 5, 1999, in 2 pages.

CAPStone Newsletter, www.capcommunity.hrsa.gov, Sep. 2001, in 8 pages.

Combs, Susan, Window on State Government, Improve the Medicaid Eligibility Determination Process, Printed Apr. 9, 2008, in 9 pages.

Crain Communications, Inc., Elective Surgery Without the Plastic: Low-Interest Medical Financing Provides Alternative to Credit Cards, Shira J. Boss, Jun. 22, 1998, in 2 pages.

Dental Office Management, Ellen Dietz, 1999, in 8 pages.

DentalFinancing.com, Grow your Practice, Patient Financing Programs, Oct. 15, 2008, in 7 pages.

Gilje, Shelby, Credit Agency Moving Into Health Care, Seattle Times, Mar. 22, 1995, in 3 pages.

Insurance Regulator, CIGNA Report Withdrawn as Foe Sees Opening, Insurance Regulator issued on Sep. 9, 1996 in 4 pages.

JBI IndiCare, On-Line Patient Assistance Program, Website Users Manual, Copyright 1997, in 17 pages.

Lavalle, Marianne, Health Plan Debate Turning to Privacy, The National Law Journal, May 30, 1994, in 4 pages.

McLaughlin, Nancy H., Greensboro News & Record (NC), Homeless, Pregnant and Alone, Westlaw, Dec. 6, 2001 in 9 pages.

Medical Writer of the Dallas Morning News, Rita Rubin, Cosmetic Surgery on Credit- Finance Plans Let Patients Reconstruct Now, Pay Later, Sep. 10, 1988 in 2 pages.

MediCredit Patient Financing, Thought You Couldn't Afford Cosmetic Surgery?, Oct. 15, 2008, in 3 pages.

Pediatrics, Official Journal of the American Academy of Pediatrics, Improving the Implementation of State Children's Health Insurance Programs for Adolescents Report of an Invitational Conference Sponsored by the American Academy of Pediatrics, Section on Adolescent Health, Sep. 26-27, 1999, in 9 pages.

Pennsylvania Law Weekly, Discriminating Against Victims, vol. XVIII, No. 26, Jun. 26, 1995, in 2 pages.

Philips Business Information, Inc., Financing Medical Procedures a Lucrative but Risky Business, vol. 10, Issue: 15, Aug. 7, 2000, in 2 pages.

PR Newswire, ACS Company Birch & Davis Wins Texas Chip Contract, May 17, 2000, in 3 pages.

Thatlook.com, Cosmetic Surgery Financing, printed Oct. 15, 2008, in 3 pages.

The Boston Pheonix, Life, Liberty, and the Pursuit of Lipo, Cosmetic Surgery is Drifting from a Cash-up-Front Business into a Credit Market that Accommodates People who Thought They Couldn't Afford it. The pitch is Simple: Doesn't Every American Deserve to be Beautiful, by Ellen Barry, Apr. 6, 1998, in 12 pages.

The Committee on Energy and Commerce, Authorizing Safety Net Public Health Programs, Aug. 1, 2001, in 226 pages.

The Face-Lift Sourcebook, Kimberly A. Henry, M.D., 2000, in 3 pages.

The Fair Credit Reporting Act, 15 USC 1681 (1992), Sec, printed Mar. 19, 2008, in 10 pages.

The Globe and Mail (Canada), Report on Networks and Electronic Communications, Newcourt Credit Turns to Extranet Services/A PC Connects to 1,200 users at once. David Thomas, Nov. 12, 1996, in 2 pages.

The Globe and Mail (Canada), Technology Quarterly: Computers Internet Speeds Credit Checks System Tailored for Doctors, Dentists, Terrance Belford, Mar. 18, 1997, in 2 pages.

The Urban Institute, Recent Changes in Texas Welfare and Work, Child Care and Child Welfare Systems, Jun. 2001, in 24 pages.

The Urban Institute, The Medicaid Eligibility Maze: Coverage Expands, but Enrollment Problems Persist, Copyright 1999, in 56 pages.

The Wall Street Journal, Health Costs, Edward Felsenthal, Aug. 12, 1991, in 2 pages.

The Wall Street Journal, Lenders Find Niche in Cosmetic Surgery that Isn't Insured—But since you Can't Repossess a Nose Job, Risks Arent' Restricted to the Patients, Michael Selz, Jan. 15, 1997, in 3 pages.

Unicorn Financial, An Even Better Solution to Financing Elective Surgery, printed Oct. 15, 2008, in 7 pages.

Washington State Office of Public Defense, Criteria and Standards for Determining and Verifying Indigency, Feb. 9, 2001, in 33 pages.

Web Site Fuels Elective Surgery Trend; The Complete Resource to Paying for Cosmetic Surgery, Laser Vision Correction and Cosmetic Dentistry, Business Wire, Apr. 7, 1999, in 2 pages.

Wisconsin, Department of Workforce Development Report, MA Program Simplification (Reduced Verification) & Client Choice of Applications, Jul. 1, 2001, in 25 pages.

Wisconsin, Department of Workforce Development, Badgercare, Jul. 1, 2000, in 7 pages.

Dental Office Management, Ellen Dietz, 1999, in 8 pgs.

JBI IndiCare, On-Line Patient Assistance Program, Website Users Manual, Copyright 1997, in 17 pgs.

The Face-Lift Sourcebook, Kimberly A. Henry, M.D., 2000, in 3 pgs.

The Urban Institute, The Medicaid Eligibility Maze: Coverage Expands, but Enrollment Problems Persist, Copyright 1999, in 56 pgs.

Calnan, Christopher, "Tenet, Fair Isaac invest $20M in startup," MHT, Mass High Tech: The Journal of New England Technology, dated Jul. 23, 2007, 2 pgs.

Custom Strategist and Qualifile, Experian Information Solutions, Inc., Jun. 2000, 2 pgs.

eFunds Introduces Qualifile, Deluxe Corporation, Sep. 1999, 4 pgs.

Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , Mar. 18, 2008, 3 pgs.

SearchAmerica, Solutions, "Payment Advisor Suite TM" Copyright 2009, 2 pgs.

Texas Department of Human Services, 1999 Annual Report, 60 Years of Progress, Medial Services 9P137, Publication No. DHS-600-FY99, 1999.

Webpage printed from <http://www.magnum.net/pdfs/RapUpBrochure.pdf.> on Mar. 4, 2008, in 2 pgs.

* cited by examiner

METHOD AND APPARATUS FOR ASSESSING CREDIT FOR HEALTHCARE PATIENTS

This application claims priority to U.S. Provisional Application No. 60/606,306 filed Sep. 1, 2004, which is incorporated herein by reference.

FIELD

The present subject matter relates to healthcare patient credit, and more particularly to methods and apparatuses to assess credit of healthcare patients.

BACKGROUND

Healthcare entities would like to know which patients are likely to pay their bills (patient financial responsibility) and which are not likely to pay. Those deemed not able to pay will receive the same treatment as other patients, but the earlier their need is identified the sooner that the healthcare facility can get the patient into financial counseling or enrolled in an appropriate Medicaid, charity care or grant program. Also, if a patient is not likely to pay and they are not eligible for charity programs, then a healthcare facility can choose to expend fewer resources trying to collect and therefore save money.

There have been attempts to predict a patient's ability to pay using conventional "generic" credit scores, but these have met limited success. This is because each healthcare facility's patient population differs from others and a generic credit score model is insufficient to accurately predict the outcomes. A generic credit score is often too general a predictor since it treats all patient segments the same.

DETAILED DESCRIPTION

Figure 1:
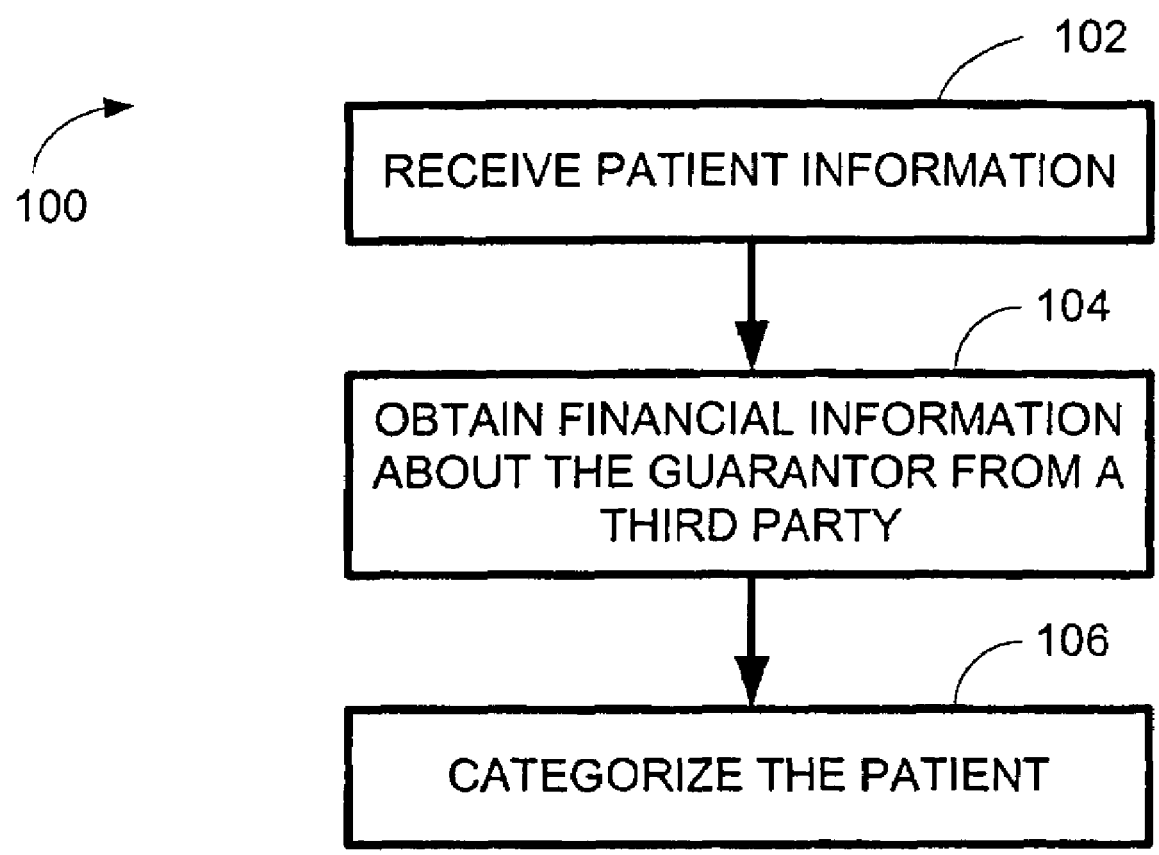
FIG. 1 illustrates a method according to an example embodiment.

In the following detailed description, reference is made to the accompanying drawings that form a part hereof, and in which is shown by way of illustration specific embodiments in which the subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. The term "computer readable media" is also used to represent electromagnetic carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, an application specific integrated circuit ("ASIC"), a microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an ASIC. Thus, the exemplary process flow is applicable to software, firmware, and hardware implementations.

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor of payment. Also, according to another example embodiment, the model is not a generic model for all patients, but the variables and their parameters are specific to a particular healthcare organization's or facility's patient population. This creates a custom model that further enhances its predictiveness.

In the example embodiment, illustrated in FIG. 1, the method 100 or programmed computing system receives information about a patient 102. The attributes can include anything that is known about the patient prior to a service being rendered. This could include patient type (i.e. inpatient, outpatient, emergency room, etc) and patient financial class (i.e. Medicare, Medicaid, commercial payer, self pay, etc), age, amount owed, marital status, etc. These variables are used to segment the patient population. These variables are also used to determine whether additional financial information from a credit bureau would increase the accuracy of the prediction of payment. Since there is a cost associated with obtaining the additional information, the benefit of the increase in predictiveness is weighed against the increased cost, and a decision is made whether to obtain the additional information.

If additional benefit is deemed positive, the financial information about the guarantor or patient is then obtained from a third party 104 or a credit bureau or similar source, for example by downloading it into the computing system determining the credit rating for the patient over a network. Such a network can include a proprietary network, a world wide network such as the Internet, or other network over which such information can be obtained. The quality and effectiveness of a data source (credit bureau) varies by geographic region. Which data source to use is determined by an algorithm called the "Bureau Selector" (see Bureau Selector section below). The information obtained can include demographic information, credit score, payment history, credit balances, mortgage status, bankruptcy, income estimates, etc. This information is used within each of the patient segments to categorize the patient 106. According to one example embodiment, the Category is a user definable grouping of patients based on likelihood of payment. For example, the categories might be "Low" probability of payment, "Medium" and "High". Those in the low category might be further segregated into those unable to pay, those eligible for Medicaid, those eligible for charity care, etc. Each category has an associated confidence level or probability associated with it. For example, a healthcare facility might want the low category to have a 90% probability for not paying and the high category to have a 90% probability for paying.

Figure 2:
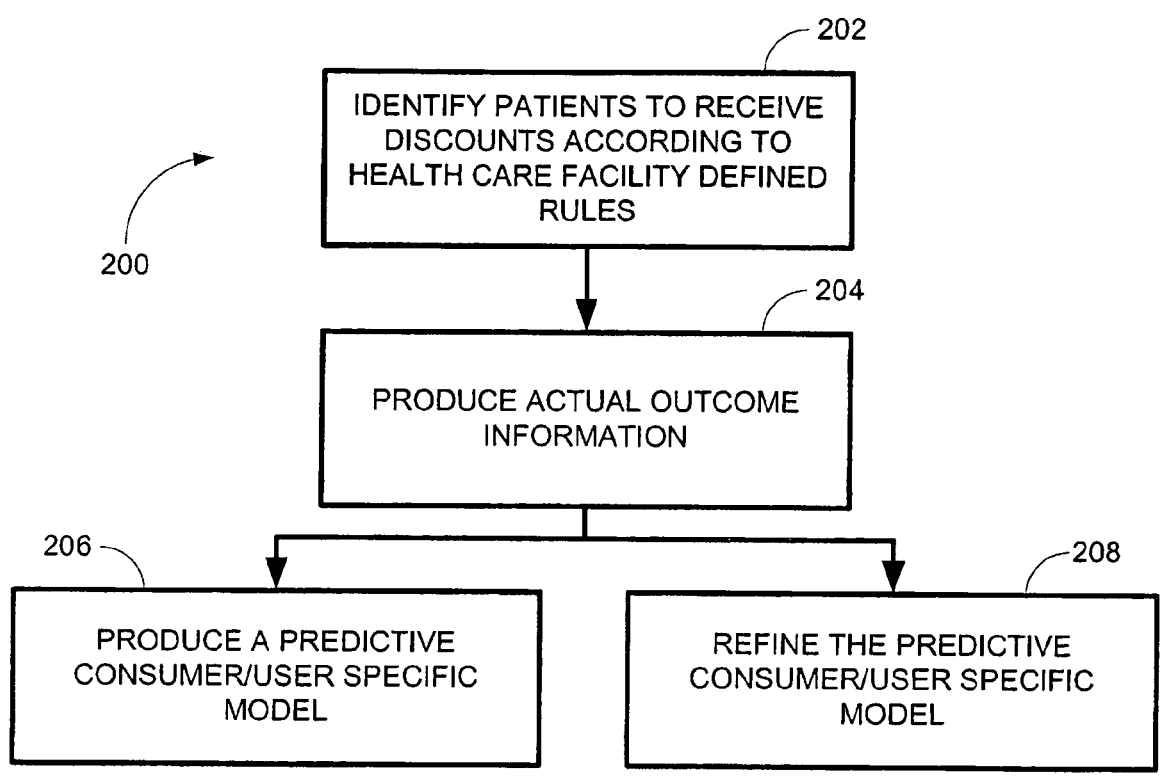
FIG. 2 illustrates a method according to an example embodiment.

Those unable to pay can, in some embodiments, also be offered a discount by the healthcare facility. These "Discounts for the Uninsured" can, or indeed in some cases must, be applied in a consistent manner across the patient population. According to one example embodiment, illustrated in FIG. 2, the method 200 and computing system identifies these patients and uses healthcare facility defined rules to determine which patients are entitled to discounts 202. For example, the healthcare facility can decide that those patients with household size of 4 whose incomes are twice the Federal Poverty Guidelines Limit (FPGL) are entitled to a 75% discount and those that are at the FPGL are entitled to a 100% discount. According to another example embodiment, the method and computing system uses an estimate of a patient's income based credit attributes and an estimate of household size based on marketing/demographic data to determine discount eligibility.

In some example embodiments, periodically a healthcare organization using the credit assessment method and system will produce actual outcomes information 204 that can be used to refine the model. The outcomes information will consist of whether the patient paid their bill, how long it took to pay, how their bill was paid, etc. The model can therefore be adjusted to more accurately predict payment based on actual experience on a periodic basis or from time to time.

These categories, probabilities, patient segmenting variables, and financial information are combined with actual outcomes data to produce a highly predictive customer/user specific model 206. This outcomes feedback process is continued on a periodic basis (i.e. monthly) or at any other desired non-periodic interval in order to continue to refine the model for a particular patient population. This is also important since small or large changes in a healthcare facility's workflow can impact the outcomes (i.e. if a healthcare facility is more aggressive in collecting co-pays during registration, more will be collected causing the financial information thresholds to need to be adjusted). These changes can be accounted for in the model by continually feeding outcomes information back 208.

Bureau Selector

Figure 3:
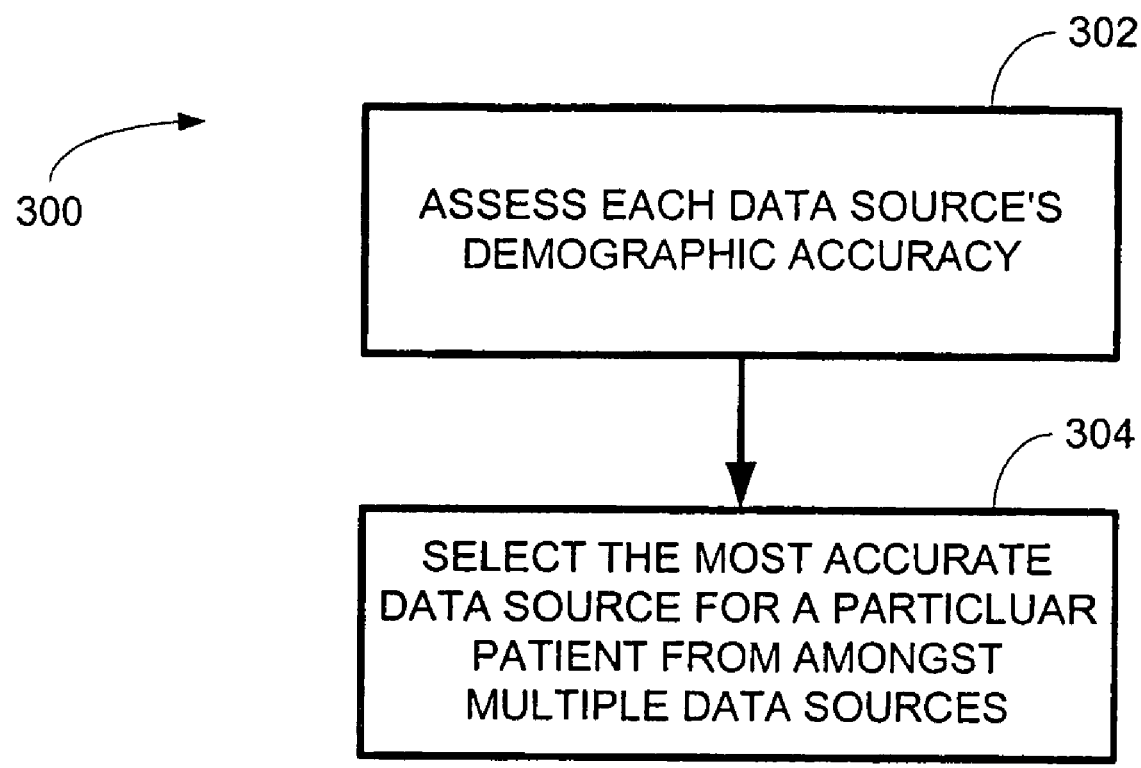
FIG. 3 illustrates a method according to an example embodiment.

According to another embodiment, illustrated in FIG. 3, a method 300 and computing systems provide for improving the accuracy of credit assessment or rating results by selecting the most accurate data source from amongst multiple data sources 304 (called the "Bureau Selector"). Each data source (e.g. credit bureau or other source of credit data) has regional strengths and weaknesses, especially in the accuracy of demographic information. According to one example embodiment, the most accurate demographic information can be obtained from the most accurate data source in a region. Accordingly, methods 300 and computing systems assess a data source's demographic accuracy 302.

The type of information that is gathered by a credit bureau is protected by multiple laws (GLB and FCRA). The information can only be used for a "permissible purpose" under the law, which includes things like collections and account review. It is not typically permissible to randomly select credit files and call people to see if the information is accurate. Instead, the accuracy must be measured as a by-product of a permissible transaction. For example, in the course of pursuing collections with an account, information in the credit report can be validated.

According to one example embodiment, the accuracy of a bureau's data is assessed 302 by using the outcomes information that is recorded by a customer/user of the credit assessment method and system. For example, Healthcare facility A is a customer/user. They use credit report information from different credit bureaus (via the above described method and system) for a permissible purpose (collections). According to one example embodiment, if an account is paid, either partially or in full, then the demographic information can be deemed to be valid because the healthcare facility was able to contact the patient either via the address or phone. If the healthcare facility receives returned mail, then the demographic information can be deemed not valid since the address did not work.

According to another example embodiment the method 300 and system assesses each data source 302 in each geographic region by looking at the first 3 digits of a patient's zip code (called an SCF). Each zip code SCF can be seeded with an initial bureau ordering (presumed strengths gleaned from external sources or the data sources themselves). As each transaction occurs and the method and system receives outcomes information, points for or against a bureau are awarded based on whether a data sources data resulted in a patient paying their bill. In this way, the ordering of data sources in a particular geography (SCF) can continually be adjusted.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter can be made without departing from the principles and scope of the inventive subject matter as expressed in the subjoined claims.

What is claimed is:

1. A computerized method to make healthcare patient credit decisions comprising:
   receiving patient information;
   obtaining financial information from a guarantor of costs associated with services the patient needs;
   determining a benefit of additional guarantor financial information from a third party; and
   obtaining the additional guarantor financial information from the third party if the benefit of the additional guarantor financial information is greater than the cost of obtaining the additional information, wherein the method is performed by a computing system comprising one or more computing devices.

2. The computerized method of claim 1, further comprising:
   segmenting the patient population into categories.

3. The computerized method of claim 2, further comprising:
   segmenting the patient population into sub-categories.

4. The computerized method of claim 2, further comprising:
   assessing a service price according to the determined patient category.

5. The computerized method of claim 1, wherein the patient information includes patient type, patient financial class, age, amount owed, and marital status.

6. The computerized method of claim 1, wherein the guarantor is other than the patient.

7. The computerized method of claim 1, wherein the third party is a credit bureau.

8. The computerized method of claim 1, wherein the financial information includes guarantor credit information.

9. The computerized method of claim 1, wherein an assessed service cost is a discounted service cost.

10. The computerized method of claim 1, wherein patient categories are defined according to healthcare facility defined rules.

11. The computerized method of claim 1, wherein the third-party source of guarantor financial information is selected from a group of third-parties as a function of actual outcome data.

12. A method comprising:
   determining a probability that patient healthcare service charges will be paid as a function of patient information and guarantor financial information obtained from a third party, wherein the probability is determined as a function of a payment probability model;
   maintaining, in a data repository, the determined probability, the patient information, the guarantor financial information, an indication of the third party source of the financial information, and received patient payment history associated with charges for the patient healthcare services; and
   refining the payment probability model as a function of information including the determined probability, the patient information, the guarantor financial information, an indication of the third party source of the financial information, and received patient payment history associated with charges for the patient healthcare services, wherein the method is performed by a computing system comprising one or more computing devices.

13. The method of claim 12, wherein refining the payment probability model includes changing the third party source of financial information to determine the payment probability.

14. A computer readable medium, with instructions thereon to cause a system to perform the method of claim 13.

15. The method of claim 12, wherein the third party is a credit bureau.

16. The method of claim 12, wherein the third party source is a healthcare specific credit bureau.

17. The method of claim 12, wherein the data repository is a database.

18. A method to make customer credit decisions comprising:
   receiving customer information from customers and from one or more third parties; and
   determining customer categories as a function of the received information and one or more credit models, wherein the one or more credit models are generated according to customized rules, determined third party information accuracy, and historical data from one or more customers, wherein the method is performed by a computing system comprising one or more computing devices.

19. The method of claim 18, wherein the one or more credit models are refined to account for additional historical data.

20. The method of claim 18, wherein each customer category is associated with a probability that a customer will pay for charges.

21. The method of claim 20, further comprising:
   modifying customer charges as a function of a determined customer category.

22. The method of claim 21, wherein the customer information includes a customer income level, and further wherein modifying customer charges includes modifying the customer charges as a function of a relationship between the customer income level and a threshold.

23. The method of claim 22, wherein the threshold is a poverty threshold.

24. The method of claim 21, wherein modifying the customer charges includes modifying the customer charges as function of a relationship between the customer probability of payment and a threshold.

25. The method of claim 18, wherein the third-party is an organization that maintains consumer data.

26. A method of selecting a third-party source of financial information, the method comprising:
   maintaining patient guarantor financial information obtained from third-parties;
   maintaining actual outcome data of guarantor collection activity; and
   selecting a third-party source of financial information for specific criteria as a function of at least the maintained guarantor financial information and the actual outcome data, wherein the method is performed by a computing system comprising one or more computing devices.

27. The method of selecting a third-party source of financial information of claim 26, wherein the third-party source is a credit bureau.

28. The method of selecting a third-party source of financial information of claim 26, wherein the specific criteria is at least a portion of a guarantor zip code.

29. The method of selecting a third-party source of financial information of claim 26, wherein selecting the third-party source of financial information for specific criteria includes:
   determining guarantor financial information obtained from a third-party is accurate when a payment is received on a guarantor account;
   determining guarantor financial information obtained from a third-party is not accurate when an attempt to contact a guarantor is not successful;
   maintaining a database of accuracy determinations; and
   selecting the third-party source of guarantor financial information from the database of accuracy determination based on the specific criteria.

* * * * *